UNITED STATES PATENT OFFICE 2,026,093

DYESTUFFS OF THE DIOXAZINE SERIES AND A PROCESS OF PREPARING THE SAME

Georg Kränzlein, Heinrich Greune, and Max Thiele, Frankfort-on-the-Main, Germany, assignors to General Aniline Works, Inc., New York, N. Y., a corporation of Delaware No Drawing. Application November 5, 1932, Serial No. 641,462. In Great Britain June 6, 1928

9 Claims. (Cl. 260—28)

The present invention relates to dyestuffs and to a process of preparing them. It is a continuation-in-part application to our copending U. S. patent application Serial No. 364,316.

We have found that benzoquinones of the following general formula:

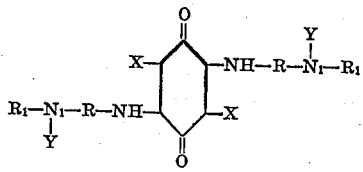

wherein X stands for hydrogen or halogen, Y for hydrogen or alkyl, R and $R_1$ each stand for an aromatic group of the benzene- or naphthalene-series, at least one of them being an aromatic group of the benzene series or R, $R_1$ and $N_1$ jointly stand for a carbazole-ring-system, and wherein the nuclei R contains an unsubstituted position in ortho-position to the NH group, when treated with high boiling inert solvents either alone or in the presence of an oxidizing agent and, if necessary, with the addition of a catalyst yield condensation products which are not, as might be expected, reddish, but are especially bluish. These products are valuable pigment dyes which are suitable, for instance, for dyeing wall paper or paper of any kind, sugar, rubber (the dyeings of rubber withstanding the known vulcanization process) and for preparing varnish and printing colors. The condensation products may be converted by sulfonation into water-soluble dyestuffs which dye the animal, vegetable and viscose fiber valuable tints.

In performing the reaction there may be used as high-boiling solvents nitrobenzene, trichlorobenzene or the like; as oxidizing agents potassium ferricyanide, pyrolusite, ferric chloride or similar products; as catalysts there may be used phosphorus pentachloride, antimony pentachloride and others. The sulfonation may preferably be carried out by means of fuming sulfuric acid or concentrated sulfuric acid.

Instead of first condensing and then introducing the sulfo group by a subsequent operation as above stated it is, of course, also possible to introduce the sulfo group before the oxazine has been formed, by starting, for instance, from an amino-diaryl-amino- or amino-carbazole-sulfonic acid.

Our invention leads to new valuable dyestuffs which probably have the following general constitution:

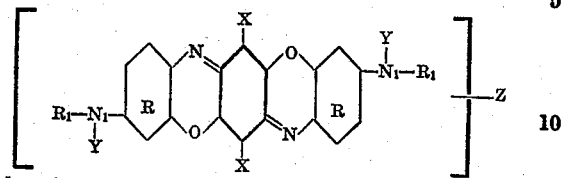

wherein Z means that the dyestuff may be sulfonated, X stands for hydrogen or halogen, Y for hydrogen or alkyl and $R_1$ for an aromatic group of the benzene or naphthalene series or $R_1$, the R-nucleus and the nitrogen atom $N_1$ jointly stand for a carbazole-ring-system, the position of the sulfo group being undetermined.

Both by virtue of their excellent fastness to light and their valuable and clear shades the new dyestuff sulfonic acids are particularly valuable for dyeing silk.

When reacting upon the said new sulfonated dyestuffs in the manner indicated in the U. S. Patent No. 1,800,299 with the bases characterized in the said application, blue, bluish-gray and bluish-green dye-pigments are obtained which are very suitable for coloring nitrocellulose (varnish)-, cellon- and alcohol lacquers.

The following examples serve to illustrate our invention, but they are not intended to limit it thereto, the parts being by weight:

(1) 148 parts of 2,5-di(N-ethylcarbazolyl-3'-amino)-3,6-dichloro-1,4-benzoquinone (obtainable by condensing chloranil with 3-amino-N-ethylcarbazol) are heated at boiling temperature with 1500 parts of nitrobenzene until the intensity of the coloration no longer increases. After cooling, the condensation product which has crystallized, is filtered by suction, washed with alcohol and dried. It forms a crystalline product showing a greenish glittering surface, being insoluble in water and the usual organic solvents and dissolving in concentrated sulfuric acid first to a violet-blue solution which, when heated, readily turns olive. When finely dispersed, the dyestuff is very suitable for dyeing wall paper or paper of any kind, sugar, rubber (the dyeings of rubber withstanding the known vulcanization process) and for preparing varnish and printing colors. It forms a violet-blue powder of good fastness to light and of great dyeing power.

By adding a few parts of potassium ferricyanide or ferric chloride or pyrolusite to the nitrobenzene the same condensation product often is obtained in a shorter time and with a better yield. Instead of nitrobenzene another solvent as, for instance, trichlorobenzene or chlorobenzene may be used.

A similar dyestuff is obtained, by using in the foregoing example instead of 2,5-di(N-ethylcarbazolyl-3'-amino)-3,6-dichloro-1,4-benzoquinone 141 parts of 2,5 - di - (N - methylcarbazolyl-3'-amino)-3,6-dichloro-1,4-benzoquinone (obtainable by condensing chloranil with 3-amino-N-methylcarbazol).

(2) 100 parts of 2,5-di-(para-aminodiphenylamine)-3,6-dichloro-1,4-benzoquinone (obtainable by condensing chloranil with para-aminodiphenylamine) are heated at boiling temperature for 8 hours with 12 parts of phosphorus pentachloride in 1000 parts of nitrobenzene. After cooling, the separated condensation product is filtered by suction, subsequently washed with alcohol and dried. It forms a crystalline powder showing a violet luster on its surface, is nearly insoluble in water and the usual organic solvents and dissolves in concentrated sulfuric acid to a blue solution. When finely dispersed, the dyestuff forms a bluish-violet pigment of good dyeing power and a very good fastness to light and which, therefore, is very suitable for dyeing wall paper or paper of any kind, sugar, rubber (the dyeings of rubber withstanding the known vulcanization process) and for preparing varnish and printing colors.

(3) 134 parts of 2,5-di-(carbazolyl-3'-amino)-3,6 - dichloro - 1,4 - benzoquinone (obtainable by condensing chloranil with 3-aminocarbazol) are heated at boiling temperature for some time with 1500 parts of nitrobenzene and 15 parts of ferric chloride. After cooling, the condensation product which has crystallized is filtered by suction, washed first with pyridine and subsequently with water and dried. The product thus obtained has a violet-blue color and, when finely dispersed, it is very suitable for dyeing wall paper or paper of any kind, sugar, rubber (the dyeings or rubber withstanding the known vulcanization process) and for preparing varnish and printing colors.

(4) 165 parts of 2,5-di-(N-ethylcarbazolyl-6'-chloro-3'-amino)-3,6-dichloro-1,4-benzoquinone (obtainable by condensing chloranil with 3-amino-6-chloro-N-ethylcarbazol) are heated at boiling temperature for a short time in 2000 parts of nitrobenzene while adding 50 parts of dinitrophenol. After cooling to 80° C., the condensation product which has crystallized is filtered by suction, subsequently washed with alcohol and dried. It forms a crystalline product which shows a greenish glittering luster on its surface and is very difficultly soluble in water and the usual organic solvents. When finely dispersed, it has a violet-blue color and is very suitable for dyeing wall paper or paper of any kind, sugar, rubber (the dyeings of rubber withstanding the known vulcanization process) and for preparing varnish and printing colors.

By substituting in Example 4 188 parts of 2,5-di-(N-ethylcarbazolyl-6'-bromo-3'-amino)-3,6-dichloro-1,4-benzoquinone for 2,5-di-(N-ethylcarbazolyl-6'-chloro-3'-amino)-3,6-dichloro-1,4-benzoquinone, or 2,5-di-(N-ethylcarbazolyl-1'-amino) - 3,6 - dichloro - 1,4 - benzoquinone, a product of very similar properties is obtained.

(5) 183 parts of 2,5-di-(N-ethylcarbazolyl-6',8'-dichloro-3'-amino)-3,6-dichloro-1,4-benzoquinone (obtainable by condensing chloranil with 6,8-dichloro-3-amino-N-ethylcarbazol) are heated at about 180° C. for some hours with 2000 parts of nitronaphthalene. After cooling to about 100° C., about 500 parts of benzene are added and the condensation product which has crystallized is filtered by suction, first washed with benzene and subsequently with alcohol and dried. There is thus obtained a product showing a greenish glittering luster on its surface and being difficultly soluble in water and the usual organic solvents. When finely dispersed, it forms a blue-violet pigment which is very suitable for dyeing wall paper or paper of any kind, sugar, rubber (the dyeings of rubber withstanding the known vulcanization process) and for preparing varnish and printing colors, and which is distinguished by a great dyeing power and a very good fastness to light.

(6) 151 parts of 2,5-di-(carbazolyl-6'-chloro-3'-amino)-3,6-dichloro-1,4-benzoquinone (obtainable by condensing chloranil with 3-amino-6-chlorocarbazol) are heated at boiling temperature for some hours in 1500 parts of trichlorobenzene while adding 30 parts of trinitrophenol. After cooling, the condensation product which has crystallized is filtered by suction, subsequently washed with alcohol and dried. There is thus obtained a crystalline product showing a greenish glittering luster on its surface and being very difficultly soluble in water and in organic solvents. When finely dispersed, it forms a blue-violet pigment which is very suitable for preparing varnish colors and for dyeing rubber (the dyeings of rubber withstanding the known vulcanization process).

(7) 131 parts of 2,5-di-(N-ethylcarbazolyl-3'-amino)-1,4-benzoquinone (obtainable by condensing benzoquinone with 3-amino-N-ethylcarbazol) are heated at boiling temperature for some hours in 1200 parts of nitrobenzene while adding 15 parts of ferric chloride. After cooling, the condensation product which has crystallized is filtered by suction, first washed with alcohol and subsequently with water and dried. A crystalline, blue-violet product is thus obtained which is rather difficultly soluble in water and the usual organic solvents and which is very suitable for dyeing wall paper or paper of any kind, sugar, rubber (the dyeings of rubber withstanding the known vulcanization process) and for preparing varnish and printing colors.

(8) As starting materials there may be used in the foregoing examples also the products which are obtainable by condensing chloranil or a benzoquinone with para- or ortho-amino-N-methyldiphenylamine, meta-amino-diphenylamine, aminophenyl-alpha- or beta-naphthlyamines, aminonaphthyl-phenylamines, amino - carbazoles or the like.

We claim:

1. The process which comprises boiling a compound of the following formula:

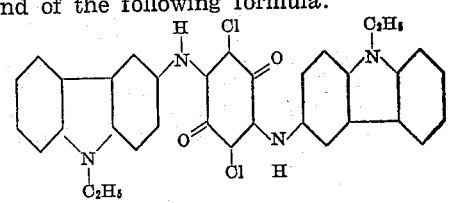

in nitrobenzene.

2. The process which comprises boiling in the presence of ferric chloride a compound of the following formula:

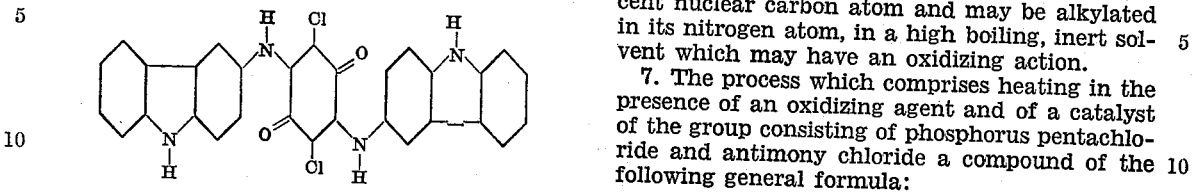

in nitrobenzene.

3. The compound of the formula:

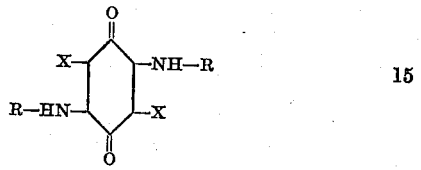

forming a violet-blue powder of good fastness to light and great dyeing power.

4. The compound of the formula:

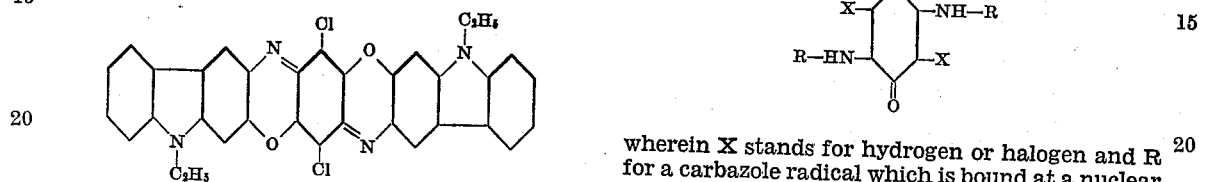

being a violet-blue dyestuff.

5. The process which comprises heating a compound of the following general formula:

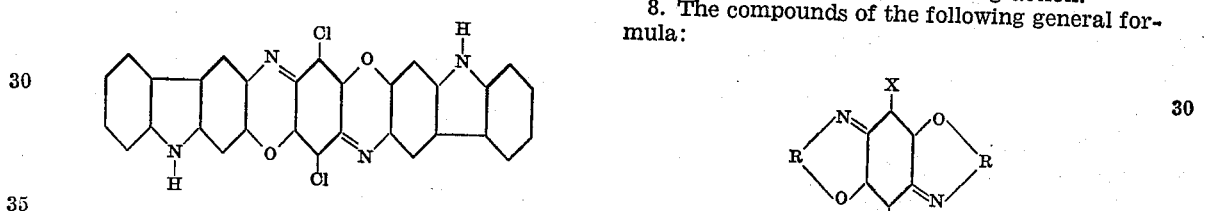

wherein X stands for hydrogen or halogen and R for a carbazole radical which is bound at a nuclear carbon atom, has at least one unsubstituted adjacent nuclear carbon atom and may be alkylated in its nitrogen atom, in a high boiling, inert solvent which may have an oxidizing action.

6. The process which comprises heating in the presence of an oxidizing agent a compound of the following general formula:

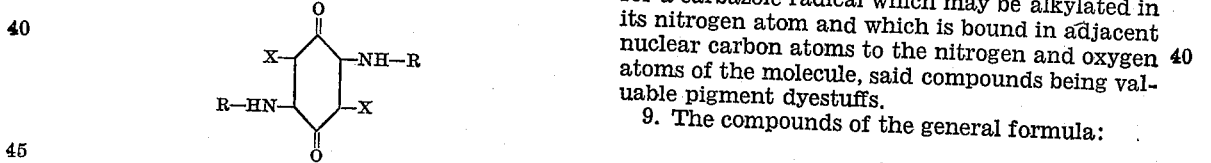

wherein X stands for hydrogen or halogen and R for a carbazole radical which is bound at a nuclear carbon atom, has at least one unsubstituted adjacent nuclear carbon atom and may be alkylated in its nitrogen atom, in a high boiling, inert solvent which may have an oxidizing action.

7. The process which comprises heating in the presence of an oxidizing agent and of a catalyst of the group consisting of phosphorus pentachloride and antimony chloride a compound of the following general formula:

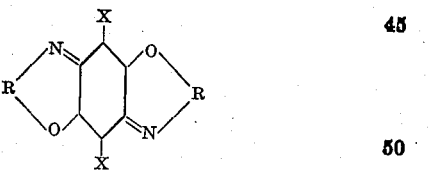

wherein X stands for hydrogen or halogen and R for a carbazole radical which is bound at a nuclear carbon atom, has at least one unsubstituted adjacent nuclear carbon atom and may be alkylated in its nitrogen atom, in a high boiling, inert solvent which may have an oxidizing action.

8. The compounds of the following general formula:

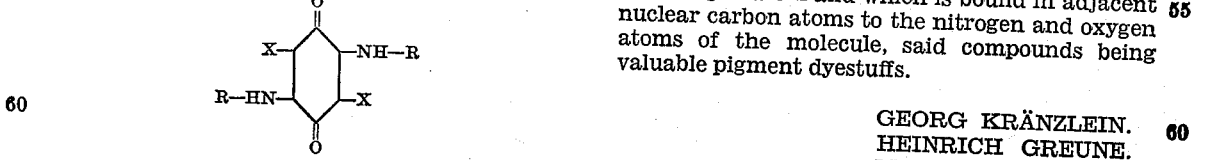

wherein X stands for hydrogen or halogen and R for a carbazole radical which may be alkylated in its nitrogen atom and which is bound in adjacent nuclear carbon atoms to the nitrogen and oxygen atoms of the molecule, said compounds being valuable pigment dyestuffs.

9. The compounds of the general formula:

wherein X stands for hydrogen or chlorine and R for a carbazole radical which may be ethylated in its nitrogen atom and which is bound in adjacent nuclear carbon atoms to the nitrogen and oxygen atoms of the molecule, said compounds being valuable pigment dyestuffs.

GEORG KRÄNZLEIN.
HEINRICH GREUNE.
MAX THIELE.